D. C. MATTESON.
Gang Plow.
No. 3,114.
Reissued Sept. 8, 1868.
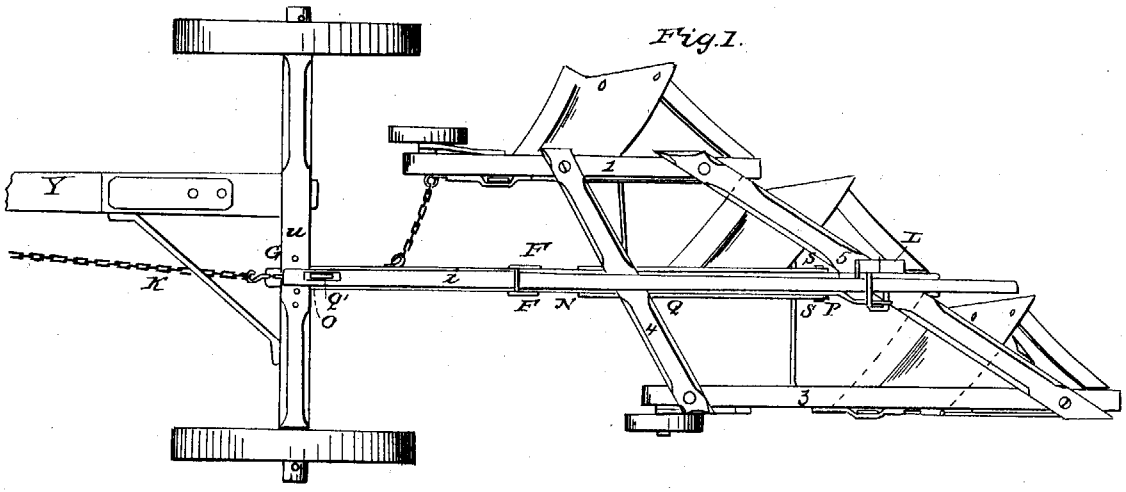
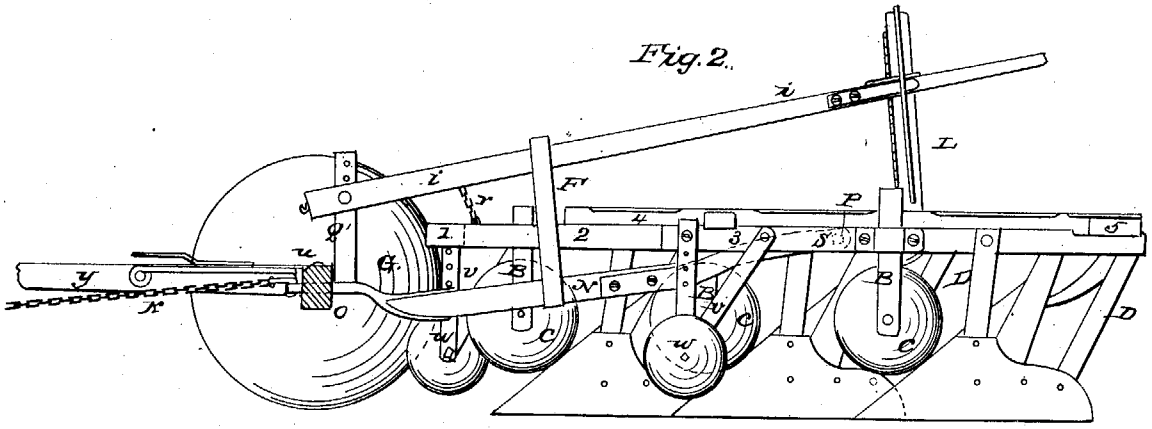
N. PETERS, Photo-Lithographer, Washington, D. C.

UNITED STATES PATENT OFFICE.

DON CARLOS MATTESON, OF STOCKTON, CALIFORNIA.

IMPROVEMENT IN GANG-PLOWS.

Specification forming part of Letters Patent No. 20,647, dated June 22, 1858; Reissue No. 3,114, dated September 8, 1868.

*To all whom it may concern:*

Be it known that I, DON CARLOS MATTESON, of the city of Stockton, county of San Joaquin, and State of California, have invented a new and useful Improvement in Gang-Plows; and I do hereby declare that the following is a full, clear, and exact description thereof, which will enable others skilled in the art to make and use the same, reference being had to the accompanying drawings, forming part of this specification, in which—

Figure 1 represents a top view of the machine, and Fig. 2 a side elevation of the same.

Similar characters of reference in the several figures denote the several parts.

The nature of my invention consists in a peculiar arrangement of devices in the construction of gang-plows, hereinafter to be described.

The gang-plows are constructed in the following manner, to wit, by three parallel beams, four by five inches, but may be larger or smaller, numbered 1, 2, and 3, two cross-bars firmly bolted to the parallel beams, numbered 4 and 5. The angle which the long cross-bar No. 5 makes with the beams 1, 2, and 3 is sixty-five degrees, and the angle which the short bar 4 makes is twenty-nine degrees thirty-one minutes, and these angles will be correct on any-sized plows. The three plows are attached to the three parallel beams Nos. 1, 2, and 3. The plows are twenty-nine inches from the hind end of each beam, and braced by three iron braces, D D D, which give them great strength and firmness. Three inches back of the plow-points is placed stationary, on beams, an iron upright, B, to which are attached three revolving cutters, *c c c*.

To the front ends of parallel beams 1 and 3 are placed gage-wheels and irons *v v'*, to regulate the depth the plows shall cut—the gage-irons *v v'* at the lower end. One has a square hole through it to prevent the axle W turning, the other a round hole, so as to shift it backward and forward to fit the hole in parallel beams 1 and 3.

There is a false beam, N, four feet long, size three by four inches, or size in proportion to size of plows, to the end of which is attached a goose-neck, G. To the hind end of false beam N and draw-irons *s s*, which attach it firmly on a bolt, P, to center of parallel beam 2, there are two standards, F F—one on each side of parallel beam 2—firmly bolted to false beam N, for the purpose of keeping parallel beam 2 in its place; one iron standard, 2', on goose-neck G, for lever *i* to rest on. The lever *i*, by means of chain *r*, is to throw the plows out of the ground, and also to gage the depth of the furrow by rising or lowering, and going from field to field, by means of a catch on a wooden standard, and guard L, axle-tree *u*, three feet eight inches between shoulders, with tongues 7, attached to the right side six inches from center of axle *u* to the center of tongue 7. The axle *u* has mortise *o*, left side of tongue, one or more feet long. The false beam F is attached by goose-neck G the to axle-tree *u*. The false beam can be shifted to the right or left in mortise *o*, as may be required, to give more or less land. The principal draft is by chain K, which is hooked into the end of goose-neck G, passing through ring under and near the point of tongue, for lead animals to draw by, to obviate side draft. The false beam N, being attached to center beam, 2, on a bolt, P, gives a greater lever-purchase in gaging the plows, and also, having the draft attached to the false beam N, gives a better chance to work over uneven ground. Catch L is to gage the plows and hold them out of the ground by use of the lever *i*, and this is done without stopping the team, and is a great improvement on the old method, for by that, in raising and lowering, it was necessary to stop the team. It is necessary by the old method, in raising and lowering, to put a pin in to hold it up; but by my method it can be raised instantly without stopping.

Having thus described my invention, I claim as new and desire to secure by Letters Patent—

The arrangement, as described, of the false beam N, goose-neck G, axle *u*, lever *i*, catch L, and the system of plows attached to their frame, as set forth, the whole being constructed and operating substantially as and for the purposes specified.

DON CARLOS MATTESON.

Witnesses:

WM. F. MCNAMARA,

ALEX. F. ROBERTS.